Sept. 16, 1947.  H. BANY ET AL  2,427,543
POWER RECTIFIER CONTROL SYSTEM
Filed May 1, 1946
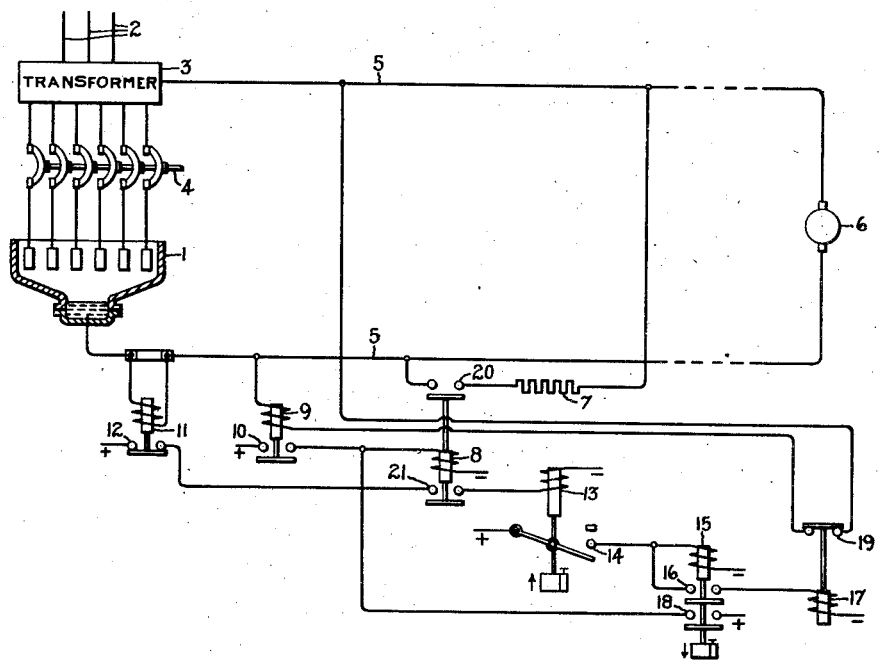
Inventors:
Herman Bany,
Amos W. Bateman,
by Ernest C. Britton
Their Attorney.

Patented Sept. 16, 1947

2,427,543

UNITED STATES PATENT OFFICE 2,427,543

POWER RECTIFIER CONTROL SYSTEM

Herman Bany, Lansdowne, and Amos W. Bateman, Yeadon, Pa., assignors to General Electric Company, a corporation of New York Application May 1, 1946, Serial No. 666,466

6 Claims. (Cl. 171—97)

Our invention relates to power rectifier control systems and particularly to a control system for a power rectifier which supplies current to a load circuit to which is connected a regenerative load. Since a power rectifier is a unidirectional device, it is necessary to provide a suitable circuit for the regenerative current while the regenerative load is regenerating. This result has been accomplished by completing across the load circuit a current consuming device, such as a resistor, when the voltage across the load circuit exceeds a predetermined value and by disconnecting the current consuming device when the load current from the rectifier exceeds a predetermined value. As the means for responding to the load circuit voltage, it is the usual practice to employ an overvoltage relay which is connected across the load circuit and which attracts its armature when the load circuit voltage exceeds a predetermined value. Since the pickup voltage of such a relay is somewhat higher than its dropout voltage, there is an unnecessary delay in the disconnection of the current consuming device when regeneration ceases as it is necessary to wait until load increases to a sufficient value to lower the load circuit voltage below the dropout voltage of the overvoltage relay.

One object of our invention is to provide an arrangement for resetting and reenergizing the voltage relay in such a power rectifier control system before the current consuming device is disconnected so as to insure that load circuit voltages between the dropout and pickup value of the overvoltage relay do not prevent the current consuming device from being disconnected.

Our invention will be better understood from the following description when taken in connection with the accompanying drawing, the single figure of which diagrammatically illustrates a power rectifier control system embodying our invention, and the scope of our invention will appear from the appended claims.

Referring to the drawing, 1 is a power rectifier which is supplied with current from a suitable alternating current circuit 2 through a power transformer 3 and an anode breaker 4 and which supplies rectified current to a load circuit 5 to which is connected a regenerative load 6.

For consuming the regenerated current during regeneration, a suitable current consuming device such as a loading resistor 7 is arranged to be connected across the load circuit 5 by an electromagnetic switch 8. The operating circuit of the switch 8 is controlled by an overvoltage relay 9 which is connected across the load circuit 5 and which is arranged to close its contacts 10 and complete an energizing circuit for the operating winding of the switch 8 when the load circuit voltage exceeds a predetermined value.

For controlling the deenergization of the operating winding of the switch 8 when regeneration ceases, we provide in accordance with our invention a current relay 11 which is connected in series relation with the output circuit of the rectifier 1 so that the contacts 12 of the relay 11 are closed only when the current output of the rectifier is above a predetermined value. The closing of the contacts 12 initiates the operation of suitable timing means such as a time relay 13 which, after being in operation for a predetermined time, momentarily closes its contacts 14 and completes an energizing circuit for an auxiliary control relay 15 which in turn by closing its contacts 16 completes an energizing circuit for a second control relay 17 through the contacts 14 of time relay 13. The relay 15, which is of the slow to drop out type, is also provided with the contacts 18 that complete a shunt around contacts 10 of relay 9 in the energizing circuit of relay 8 so that, irrespective of the contacts 10 of relay 9, the operating winding of switch 8 remains energized as long as relay 15 remains in its energized position. The energization of the second control relay 17 opens contacts 19 which are in the energizing circuit of the overvoltage relay 9 so that the overvoltage relay is reset to its deenergized position.

The operation of the arrangement shown in the drawing is as follows: Under normal operating conditions the rectifier 1 supplies current to the load circuit 5 and the value of the rectifier output current is usually sufficient to cause relay 11 to close its contacts 12, but the closing of these contacts 12 has no effect while the switch 8 is open. Also, as long as there is no regeneration, the load circuit voltage remains below the pickup value of the overvoltage relay 9 so that the control devices are in the positions in which they are shown.

When regeneration occurs, the voltage across the load circuit 5 increases to a sufficiently high value to cause the relay 9 to close its contacts 10 and complete the energizing circuit for the switch 8, which by closing its contacts 20 connects the resistor 7 across the load circuit 5. The switch 8 also closes its contacts 21 which are in the energizing circuit for the time relay 13, but this circuit is now open at the contacts 12 of the current relay 11 which are opened before the load circuit voltage reaches a high enough value to pick up the overvoltage relay 9 because the output current of the rectifier 1 is then below the drop-out value of the current relay 11. As long as the regeneration continues, the regenerative current is consumed in the resistor 7.

When regeneration ceases, the load circuit voltage drops to a low enough value to allow the rectifier to supply current to the load circuit so that relay 11 closes its contacts 12 and completes through contacts 21 of switch 8 the energizing circuit for time relay 13. After being energized for a predetermined time, relay 13 closes its contacts 14 for a sufficient length of time to effect the energization of control relay 15 which in turn by closing its contacts 16 completes an energizing circuit for control relay 17 through the momentarily closed contacts 14 of relay 13. The closing of contacts 18 of relay 15 completes a shunt circuit around the contacts 10 of relay 9 so that the switch 6 remains closed as long as relay 15 remains in its energized position. The opening of the contacts 19 of relay 17 interrupts the energizing circuit of overvoltage relay 9 so that it resets and opens its contacts 10.

As soon as the time relay 13 opens its momentarily closed contacts 14, the relay 17 immediately closes its contacts 19 to reconnect the overvoltage relay 9 across the load circuit 5. After the contacts 14 of the relay 13 have been opened for a predetermined time, the relay 15 opens its contacts 16 and 18. Therefore, if after relay 11 closes its contacts, regeneration again occurs before the relay 15 drops out, the switch 8 is maintained closed because as soon as relay 17 closes its contacts 19 the relay 9 again closes its contacts 10. However, if there is no regeneration, the switch 8 opens as soon as relay 15 opens its contacts 18 even though the load circuit voltage may for some reason be above the dropout value of relay 9 but below its pickup value. Also it will be observed that if the disconnection of the resistor 7, by the opening of the contacts 20, results in an overvoltage, the overvoltage relay is operative immediately to reconnect the resistor across the load circuit.

While we have, in accordance with the patent statutes, shown and described our invention as applied to a particular system, and as embodying various devices diagrammatically indicated, changes and modifications will be obvious to those skilled in the art, and we therefore aim in the appended claims to cover all such changes and modifications as fall within the true spirit and scope of our invention.

What we claim as new and desire to secure by Letters Patent of the United States, is:

1. In an arrangement for controlling the connection of a current consuming device across a direct current load circuit connected to a regenerative load and supplied by a power rectifier, the combination of an overvoltage relay arranged to be connected across the load circuit, means controlled by said relay for effecting the connection of the current consuming device across the load circuit when the voltage thereof exceeds a predetermined value, a current relay arranged to be connected so as to be responsive to the flow of current from the rectifier to the load circuit, and means controlled by said current relay when it is energized by a predetermined current flow from the rectifier to the load circuit while the current consuming device is connected across the load circuit for interrupting and subsequently reestablishing the circuit of said overvoltage relay.

2. In an arrangement for controlling the connection of a current consuming device across a direct current load circuit connected to a regenerative load and supplied by a power rectifier, the combination of an overvoltage relay arranged to be connected across the load circuit, means controlled by said relay for effecting the connection of the current consuming device across the load circuit when the voltage thereof exceeds a predetermined value, a current relay arranged to be connected so as to be responsive to the flow of current from the rectifier to the load circuit, and means controlled by said current relay when it is energized by a predetermined current flow from the rectifier to the load circuit while the current consuming device is connected across the load circuit for interrupting and subsequently reestablishing the circuit of said overvoltage relay and for maintaining the current consuming device connected across the load circuit for a predetermined time after said overvoltage relay circuit is reestablished.

3. In an arrangement for controlling the connection of a current consuming device across a direct current load circuit connected to a regenerative load and supplied by a power rectifier, the combination of an overvoltage relay arranged to be connected across the load circuit, means controlled by said relay for effecting the connection of the current consuming device across the load circuit when the voltage thereof exceeds a predetermined value, a current relay arranged to be connected so as to be responsive to the flow of current from the rectifier to the load circuit, timing means controlled by said overvoltage relay when it is energized by a predetermined current flow from the rectifier to the load circuit, and means controlled by said timing means for interrupting and subsequently reestablishing the circuit of said overvoltage relay while maintaining the current consuming device connected across the load circuit until after the circuit of said overvoltage relay is reestablished.

4. In an arrangement for controlling the connection of a current consuming device across a direct current load circuit connected to a regenerative load and supplied by a power rectifier, the combination of an overvoltage relay arranged to be connected across the load circuit, means controlled by said relay for effecting the connection of the current consuming device across the load circuit when the voltage thereof exceeds a predetermined value, a current relay arranged to be connected so as to be responsive to the flow of current from the rectifier to the load circuit, a timing means, means controlled by said overvoltage relay for initiating the operation of said timing means when the current output of the rectifier exceeds a predetermined value while the current consuming device is connected across the load circuit, a time delay dropout relay, means controlled by said timing means for momentarily energizing said time delay dropout relay and for momentarily resetting said overvoltage relay, and means controlled by said time delay dropout relay for maintaining said current consuming device connected across the load circuit while said time delay dropout relay is in its energized position.

5. In an arrangement for controlling the connection of a current consuming device across a direct current load circuit connected to a regenerative load and supplied by a power rectifier, the combination of an overvoltage relay arranged to be connected across the load circuit, means controlled by said relay for effecting the connection of the current consuming device across the load circuit when the voltage thereof exceeds a predetermined value, and means responsive to a cessation of regeneration by the regenerative load while the current consuming device is connected across the load circuit for changing the connections of said overvoltage relay so as to reset it to its normal undervoltage condition and then reestablishing the normal connections of said overvoltage relay while maintaining the current consuming device connected across the load circuit.

6. In an arrangement for controlling the connection of a loading means for regenerative power in a direct current circuit supplied by a power rectifier, the combination of an overvoltage relay normally responsive to an overvoltage of said circuit of a predetermined value, means controlled by said relay for effecting the connection of the loading means across the circuit when said overvoltage of said predetermined value occurs, means responsive to a predetermined regenerative condition of the circuit while said loading means is connected across said circuit for rendering said overvoltage relay unresponsive to said overvoltage of a predetermined value and then responsive to such an overvoltage, and means for maintaining said loading means connected across said circuit while said responsiveness of said relay is being changed.

HERMAN BANY.
AMOS W. BATEMAN.